(12) United States Patent
Yang et al.

(10) Patent No.: US 11,206,324 B2
(45) Date of Patent: Dec. 21, 2021

(54) MOBILE TERMINAL, MOBILE PHONE, AND ELECTRONIC DEVICE

(71) Applicant: GUANGDONG OPPO MOBILE TELECOMMUNICATIONS CORP., LTD., Guangdong (CN)

(72) Inventors: Zimei Yang, Guangdong (CN); Maozhao Huang, Guangdong (CN); Mingren Chen, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/983,606

(22) Filed: Aug. 3, 2020

(65) Prior Publication Data
US 2020/0366776 A1 Nov. 19, 2020

Related U.S. Application Data

(63) Continuation of application No. PCT/CN2019/083039, filed on Apr. 17, 2019.

(30) Foreign Application Priority Data

Apr. 28, 2018 (CN) .......................... 201810400119.6

(51) Int. Cl.
*H04M 1/00* (2006.01)
*H04M 1/02* (2006.01)

(52) U.S. Cl.
CPC ....... *H04M 1/0266* (2013.01); *H04M 1/0262* (2013.01); *H04M 1/0264* (2013.01)

(58) Field of Classification Search
CPC ............. H04M 1/0262; H04M 1/0264; H04M 1/0266; H04M 1/0274; H04M 1/0277;
(Continued)

(56) References Cited

U.S. PATENT DOCUMENTS

| 6,731,951 B1 * | 5/2004 | Takebe .................. H04M 1/725 455/557 |
| 6,917,792 B2 * | 7/2005 | Kim ..................... H04B 1/3805 455/127.5 |

(Continued)

FOREIGN PATENT DOCUMENTS

| CN | 101291155 A | 10/2008 |
| CN | 201966966 U | 9/2011 |

(Continued)

OTHER PUBLICATIONS

Extended European Search Report for EP Application 19791873.3 dated Mar. 10, 2021. (9 pages).

(Continued)

*Primary Examiner* — Nhan T Le
(74) *Attorney, Agent, or Firm* — Young Basile Hanlon & MacFarlane, P.C.

(57) ABSTRACT

A mobile terminal includes a hand-held portion and a body portion. The hand-held portion includes a first wireless communication module, a display screen, and a first power module electrically connected to the first wireless communication module and the display screen. The body portion includes a camera module, a second wireless communication module, a third communication module, and a second power module. The second power module is electrically connected to the camera module, the second wireless communication module, and the third wireless communication module. The third wireless communication module is configured to communicatively connect to an external device. The body portion defines a receiving space. The hand-held portion is received into or taken out of the receiving space. After being taken out of the receiving space, the second wireless communication module is communicatively connected to the first wireless communication module.

20 Claims, 9 Drawing Sheets

(58) Field of Classification Search
CPC ....... H04M 1/6066; H04M 2001/0204; H04M 2250/52

See application file for complete search history.

(56) References Cited

U.S. PATENT DOCUMENTS

| | | | |
|---|---|---|---|
| 9,740,256 B2* | 8/2017 | Hsi | .......................... G06F 1/266 |
| 10,516,280 B2* | 12/2019 | Tamaki | .................... G06F 1/266 |
| 2008/0026803 A1 | 1/2008 | Demuynck | |
| 2011/0070923 A1 | 3/2011 | Tang et al. | |
| 2017/0265314 A1 | 9/2017 | Yao et al. | |

FOREIGN PATENT DOCUMENTS

| | | |
|---|---|---|
| CN | 202059455 U | 11/2011 |
| CN | 202856839 U | 4/2013 |
| CN | 203406909 U | 1/2014 |
| CN | 104125317 A | 10/2014 |
| CN | 205389228 U | 7/2016 |
| CN | 205507739 U | 8/2016 |
| CN | 106034167 A | 10/2016 |
| CN | 106034168 A | 10/2016 |
| CN | 106843389 A | 6/2017 |
| CN | 107070478 A | 8/2017 |
| CN | 107864241 A | 3/2018 |
| CN | 107920144 A | 4/2018 |
| CN | 208353374 U | 1/2019 |
| CN | 208401903 U | 1/2019 |
| CN | 111142281 A | 5/2020 |
| TW | 201029426 A | 8/2010 |

OTHER PUBLICATIONS

Indian Examination Report for IN Application 202017037097 dated May 25, 2021. (6 pages).
International search report issued in corresponding application No. PCT/CN2019/083039 dated May 29, 2019.
English Translation of First Chinese Office Action from Application No. 201810400119.6 dated May 5, 2020.

* cited by examiner

MOBILE TERMINAL, MOBILE PHONE, AND ELECTRONIC DEVICE

CROSS-REFERENCE TO RELATED APPLICATION(S)

The present application is a continuation application of International (PCT) Patent Application No. PCT/CN2019/083039, filed on Apr. 17, 2019, which claims foreign priority to Chinese Patent Application No. 201810400119.6, filed on Apr. 28, 2018, the entire contents of both of which are hereby incorporated by reference in their entireties.

TECHNICAL FIELD

The present disclosure generally relates to the technical field of mobile terminals, and in particular to a mobile terminal, a mobile phone, and an electronic device.

BACKGROUND

A trend of making a mobile terminal, such as a mobile phone, lighter and thinner has become increasingly obvious. Costumers also demand better performance of the mobile phone. However, the mobile phone being light and thin and the mobile phone having better performance may constrain each other, such that designing a conventional mobile phone may hit a plateau.

SUMMARY

According to a first aspect of the present disclosure, a mobile terminal is provided and includes a hand-held portion and a body portion. The hand-held portion includes a first wireless communication module, a first power module, and a display screen. The first power module is electrically connected to both the first wireless communication module and the display screen. The body portion includes a camera module, a second wireless communication module, a third wireless communication module, and a second power module. The second power module is electrically connected to the camera module, the second wireless communication module, and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. A portion of the front surface is used as a light incidence surface for the camera module and allows light to pass through and enter the camera module. The hand-held portion is capable of being received into or taken out of the receiving space. When the hand-held portion is taken out of the receiving space, the second wireless communication module is communicatively connected to the first wireless communication module.

According to a second aspect of the present disclosure, a mobile phone is provided and includes a hand-held portion and a body portion. The hand-held portion includes a first wireless communication module, a first power module, and a display screen. The first power module is electrically connected to both the first wireless communication module and the display screen. The body portion includes a second wireless communication module, a third wireless communication module, and a second power module. The second power module is electrically connected to the second wireless communication module and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. The hand-held portion is capable of being received into or taken out of the receiving space. When the hand-held portion is taken out of the receiving space, the second wireless communication module is communicatively connected to the first wireless communication module.

According to a third aspect of the present disclosure, an electronic device is provided and includes a hand-held portion and a body portion. The hand-held portion includes a first wireless communication module, a first power module, and a display screen. The display screen has a display surface to display information for a user, and the first power module is electrically connected to both the first wireless communication module and the display screen. The body portion includes a second wireless communication module, a third wireless communication module, and a second power module. The second power module is electrically connected to the second wireless communication module and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. The receiving space has a first wall and a second wall opposite to the first wall. At least one spring button is arranged on the first wall and protrude out of the first wall towards an inside of the receiving space, a side edge of the hand-held portion defines at least one button slot, the at least one spring button is configured to be received in the at least one button slot, such that the hand-held portion is engaged with the body portion. When the hand-held portion is taken out of the receiving space, the second wireless communication module is communicatively connected to the first wireless communication module.

BRIEF DESCRIPTION OF DRAWINGS

To further illustrate technical solutions of embodiments of the present disclosure or a relative art clearly, drawings needed for describing the embodiments or the relative art will be briefly introduced. Obviously, the following drawings show only some embodiments of the present disclosure, and to any one of skill in the art, drawings of other embodiments may be obtained without making creative work.

DETAILED DESCRIPTION

Figure 1:
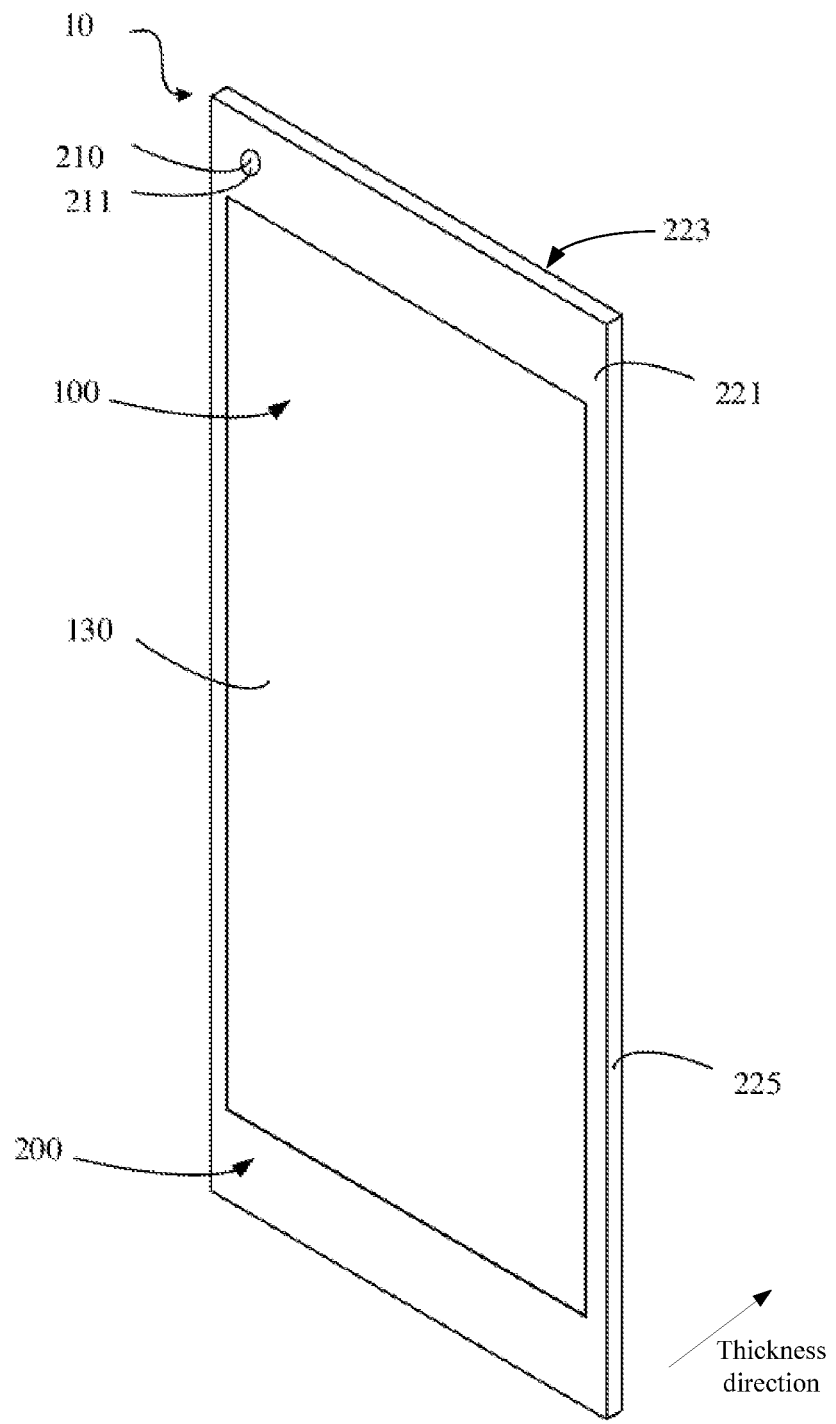
FIG. 1 is a perspective view of a state of a mobile terminal according to an embodiment of the present disclosure.

In order to understand the present disclosure better, the present disclosure will be comprehensively described by referring to the drawings. The drawings show some embodiments of the present disclosure. However, the present disclosure may be achieved by various means, which are not limited by the embodiments of the present disclosure. On the contrary, providing the embodiments is for the purpose of understanding the present disclosure more thoroughly and comprehensively.

A terminal device mentioned in the present disclosure may refer to a device able to receive and/or send a communication signal by being connected by one or more of the following means.

(1) The device may be connected via a wired line, such as public switched telephone networks (PSTN), a digital subscriber line (DSL), a digital cable, or a direct cable.

(2) The device may be connected via a wireless interface, such as a cellular network, a wireless local area network (WLAN), a digital television network such as a DVB-H network, a satellite network, or an AM-FM broadcast transmitter.

The device configured to communicate via the wireless interface may be referred as a mobile terminal. Examples of the mobile terminal may include, but is not limited to, following electronic devices: a satellite phone or a cellular phone; a terminal having a personal communication system (PCS) combining functions of the cellular wireless phone, data processing, faxing, and data communication; a personal digital assistant (PDA) serving as the wireless phone and a pager, connected to an internet/intranet, and installed with a Web browser, a note, a calendar, and a global positioning system receiver; a typical laptop and/or hand-held receiver; and a typical laptop and/or hand-held radio phone transceiver.

According to a first aspect of the present disclosure, a mobile terminal is provided and includes a hand-held portion and a body portion. The hand-held portion includes a first wireless communication module, a first power module, and a display screen. The first power module is electrically connected to both the first wireless communication module and the display screen. The body portion includes a camera module, a second wireless communication module, a third wireless communication module, and a second power module. The second power module is electrically connected to the camera module, the second wireless communication module, and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. A portion of the front surface is used as a light incidence surface for the camera module and allows light to pass through and enter the camera module. The hand-held portion is capable of being received into or taken out of the receiving space. When the hand-held portion is taken out of the receiving space, the second wireless communication module is communicatively connected to the first wireless communication module.

In some embodiments, the receiving space has a first wall and a second wall opposite to the first wall. The first wall and the second wall are symmetrical around a central axis along a length direction of the body portion. The body portion defines a central plane parallel to the front surface and the rear surface, and a distance between the front surface and the central plane is equal to a distance between the rear surface and the central plane. The first wall is symmetrical about the central plane, and the second wall is symmetrical about the central plane, such that the hand-held portion is capable of being received into the receiving space from the front surface or the rear surface, enabling the display screen and the light incidence surface face towards a same direction.

In some embodiments, the receiving space has a first wall and a second wall opposite to the first wall, the first wall and the second wall are symmetrical around a central axis along a length direction of the body portion, the body portion defines a central plane parallel to the front surface and the rear surface, a distance between the front surface and the central plane is equal to a distance between the rear surface and the central plane, the first wall is symmetrical about the central plane, the second wall is symmetrical about the central plane, such that the hand-held portion is capable of being received into the receiving space from the front surface or the rear surface, enabling the display screen and the light incidence surface face towards two opposite directions.

In some embodiments, the receiving space is further defined to extend through body portion along a width direction of the body portion, such that the side surface is interrupted, and the hand-held portion is capable of being received into the receiving space from the interrupted side surface, such that the display screen and the light incidence surface face towards a same direction or two opposite directions.

In some embodiments, the hand-held portion includes a front face, a rear face, and a side face connecting to the front face and the rear face, the display screen is disposed on the front face; and the hand-held portion is capable of being received in to the receiving space from a side on which the front face is arranged or a side on which the rear face is arranged.

In some embodiments, the receiving space has a first wall and a second wall opposite to the first wall, the first wall is arranged with a spring button protruding out of the first wall towards an inside of the receiving space, a side edge of the hand-held portion defines a button slot, and the spring button is configured to be inserted into the button slot, such that the hand-held portion is engaged with the body portion.

In some embodiments, a plurality of spring buttons are arranged on the first wall and spaced apart from each other; and each of the spring buttons, the first wall, and the hand-held portion defines a recessed grip.

In some embodiments, the second wall defines a guiding groove extending along a length direction of the body portion, another side edge of the hand-held portion is arranged with a guiding rail, and the guiding rail is configured to be received into the guiding groove.

In some embodiments, each of the first wireless communication module and the second wireless communication module is a Bluetooth communication module, a WiFi communication module, a ZigBee communication module, or a near field communication module.

In some embodiments, when the hand-held portion is received in the receiving space, one of the front surface and the rear surface is arranged to align with a side on which the display screen of the hand-held portion is arranged, and the other of the front surface and the rear surface is arranged to align with a side opposite to the side on which the display screen of the hand-held portion is arranged.

In some embodiments, the hand-held portion is arranged with a recharging interface, the body portion is arranged with a discharging interface; and the body portion is configured to recharge the hand-held portion when the hand-held portion is engaged with the body portion.

According to a second aspect of the present disclosure, a mobile phone is provided and includes a hand-held portion and a body portion. The hand-held portion includes a first wireless communication module, a first power module, and a display screen. The first power module is electrically connected to both the first wireless communication module and the display screen. The body portion includes a second wireless communication module, a third wireless communication module, and a second power module. The second power module is electrically connected to the second wireless communication module and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. The hand-held portion is capable of being received into or taken out of the receiving space. When the hand-held portion is taken out of the receiving space, the second wireless communication module is communicatively connected to the first wireless communication module.

In some embodiments, the body portion includes a camera module electrically connected to the second power module, and the camera module is capable of receiving ambient light from the front surface.

In some embodiments, a direction towards which the display screen displays information and a direction from which the ambient light enters the camera module are the same.

In some embodiments, a direction towards which the display screen displays information and a direction from which the ambient light enters the camera module are two opposite directions.

In some embodiments, the receiving space further extends through the body portion along a width direction of the body portion, such that the side surface is interrupted, and the hand-held portion is capable of being received into the receiving space from the interrupted side surface, such that a direction towards which the display screen displays information and a direction from which the ambient light enters the camera module are the same or opposite to each other.

In some embodiments, the receiving space has a first wall and a second wall opposite to the first wall, the first wall is arranged with a spring button protruding out of the first wall towards an inside of the receiving space, a side edge of the hand-held portion defines a button slot, and the spring button is configured to be received into the button slot, such that the hand-held portion is engaged with the body portion.

In some embodiments, a plurality of spring buttons are arranged on the first wall and spaced apart from each other; and each of the spring buttons, the first wall, and the hand-held portion defines a recessed grip.

In some embodiments, the second wall defines a guiding groove extending along a length direction of the body portion, another side edge of the hand-held portion is arranged with a guiding rail, and the guiding rail is configured to be received into the guiding groove.

According to a third aspect of the present disclosure, an electronic device is provided and includes a hand-held portion and a body portion. The hand-held portion includes a first wireless communication module, a first power module, and a display screen. The display screen has a display surface to display information for a user, and the first power module is electrically connected to both the first wireless communication module and the display screen. The body portion includes a second wireless communication module, a third wireless communication module, and a second power module. The second power module is electrically connected to the second wireless communication module and the third wireless communication module. The third wireless communication module is configured to communicatively connect to an external device. The body portion has a front surface, a rear surface opposite to the front surface, and a side surface connecting to the front surface the rear surface. The body portion defines a receiving space extending through the front surface and the rear surface. The receiving space has a first wall and a second wall opposite to the first wall. At least one spring button is arranged on the first wall and protrude out of the first wall towards an inside of the receiving space, a side edge of the hand-held portion defines at least one button slot, the at least one spring button is configured to be received in the at least one button slot, such that the hand-held portion is engaged with the body portion. When the hand-held portion is taken out of the receiving space, the second wireless communication module is communicatively connected to the first wireless communication module.

Figure 2:
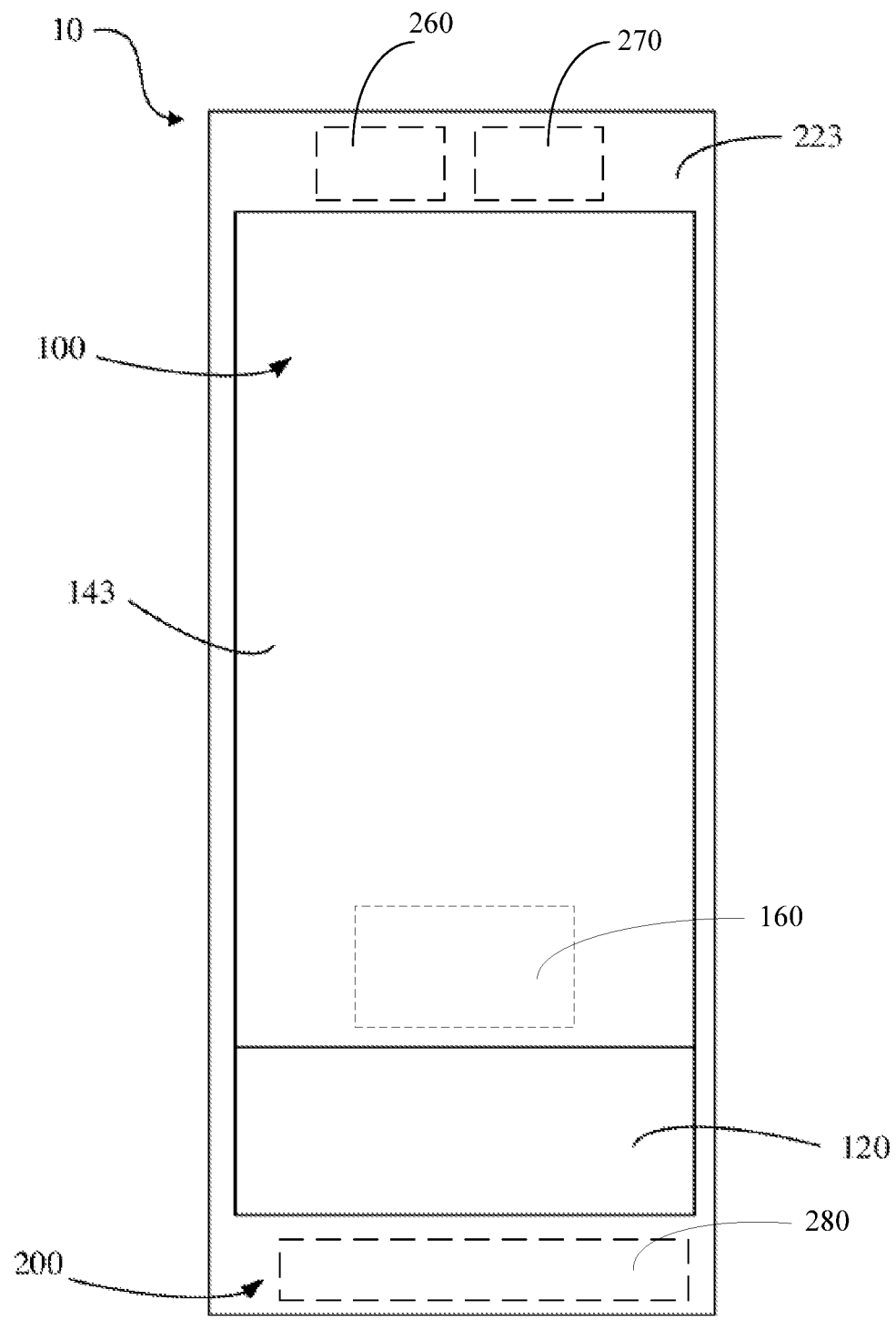
FIG. 2 is a rear view of the state of the mobile terminal shown in FIG. 1.
Figure 3:
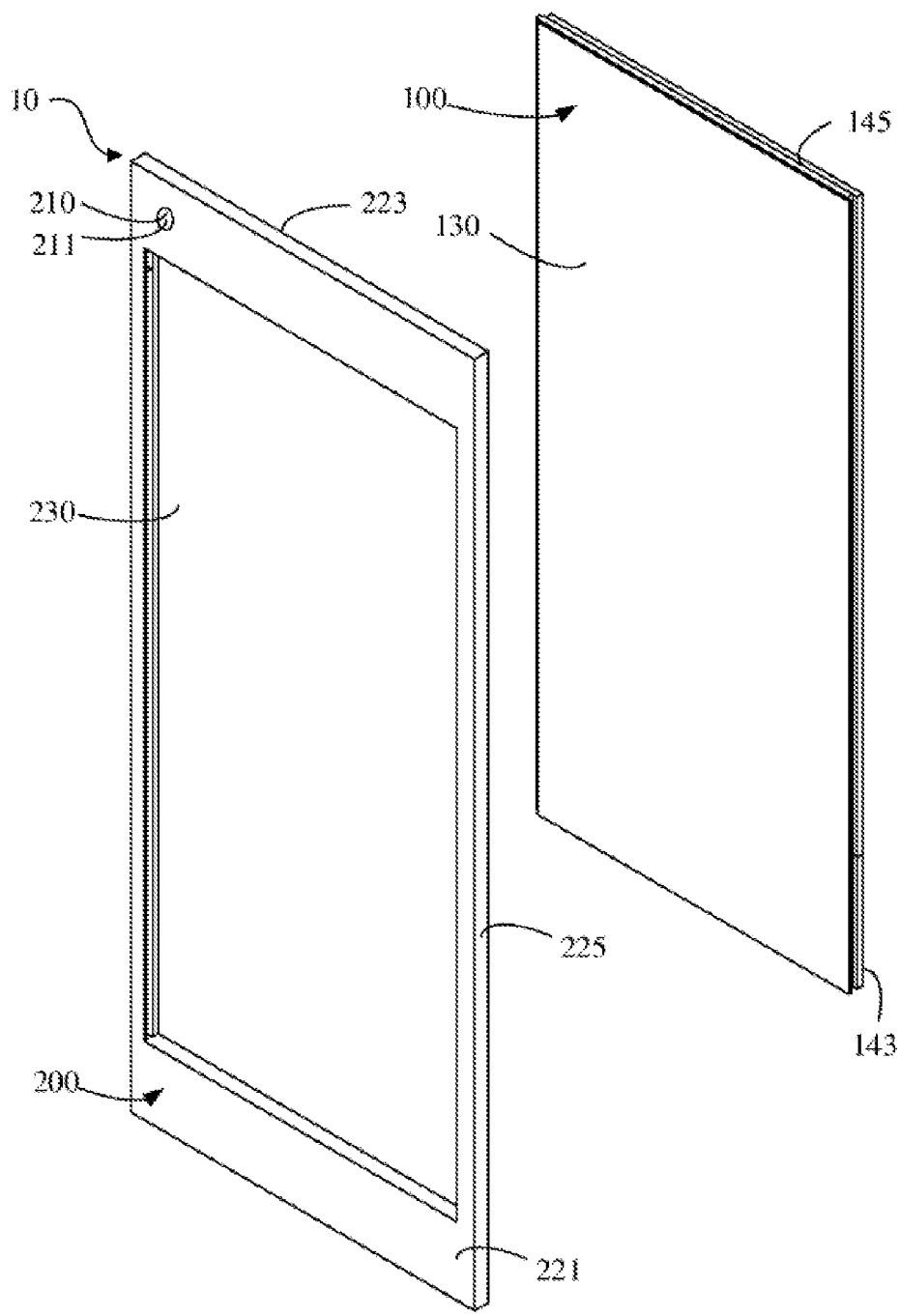
FIG. 3 is an exploded perspective view of the mobile terminal shown in FIG. 1.

As shown in FIGS. 1 to 3, in one embodiment, the mobile terminal 10 may be a smart phone. The mobile terminal 10 may include a hand-held portion 100 and a body portion 200, and the hand-held portion 100 and the body portion 200 may be detached from each other and used independently. The hand-held portion 100 may include a first wireless communication module 160, a first power module 120, and a display screen 130. The first power module 120 may be electrically connected to both the first wireless communication module 160 and the display screen 130. The first power module 120 may provide power to the first wireless communication module 160 and the display screen 130. The body portion 200 may include a camera module 210, a second wireless communication module 260, a third wireless communication module 270, and a second power module 280. The second power module 280 may be electrically connected to the camera module 210, the second wireless communication module 260, and the third wireless communication module 270. The third wireless communication module 270 may be configured to communicate with an external device, such as a station. The body portion 200 may have a front surface 221, a rear surface 223 opposite to the front surface 221, and a side surface 225 connecting to the front surface 221 and the rear surface 223. The body portion 200 may define a receiving space 230 extending through the front surface 221 and the rear surface 223. A portion of the front surface 221 may be used as a light incidence surface 211 for the camera module 210 and may allow light to pass through and enter the camera module 210. The hand-held portion 100 is able to be received in the receiving space 230 and detached out of the receiving space 230. After the hand-held portion 100 is detached out of the receiving space 230, the second wireless communication module 260 may be communicatively connected to the first wireless communication module 160.

The first power module 120 may include a nuclear battery, such as a Tritium battery, being in a small size and light, having a long service life, and being able to provide power to the display screen 130 and other electronic elements arranged inside the hand-held portion 100, such that the hand-held portion 100 may be produced to be light and thin. In other embodiments, the first power module 120 may include a Lithium battery or the like. The first power module 120 may be recharged and discharge repeatedly to provide power to the display screen 130 and other electronic elements arranged inside the hand-held portion 100. The hand-held portion 100 may exhibit relatively simple functions, such that a relatively small number of electronic elements may be arranged inside the hand-held portion 100, and runtime of the hand-held portion 100 may be improved. In one embodiment, the second power module 280 may include the Lithium battery able to be recharged and discharge repeatedly and provide power to the camera module 210, the second wireless communication module 260, and the third wireless communication module 270.

A short-range communication technology may be applied to the first wireless communication module 160 and the second wireless communication module 260, and the first wireless communication module 160 and the second wireless communication module 260 may use a same communication protocol. For example, the first wireless communication module 160 and the second wireless communication module 260 may both be a Bluetooth communication module, a WiFi communication module, an infrared data association module, a ZigBee communication module, an ultra wide band communication module, a near field communication module, or the like. Data transmission between the hand-held portion 100 and the body portion 200 may be achieved via communicative connection between the first wireless communication module 160 and the second wireless communication module 260. For example, data transmitted from the body portion 200 to the hand-held portion 100 may further be transferred into a display signal, a touch signal, and the like. Data transmitted from the hand-held portion 100 to the body portion 200 may be stored or further processed. In other embodiments, the hand-held portion 100 may further include an audio output module configured to output an audio, an image capturing component configured to take a video or capture an image, and the like, which will not be described in details hereinafter.

In the above-mentioned mobile terminal 10, the hand-held portion 100 may include the first wireless communication module 160, the display screen 130, and the first power module 120. The first wireless communication module 160 of the hand-held portion 10 may be communicatively connected to the second wireless communication module 260 of the body portion 200. The hand-held portion 100 may be detached from the body portion 200, receive signals sent from the body portion 200, transfer the signals into the display signal to display information for a user, and provide other functions for the user to use the hand-held portion normally, and the body portion 200 may be placed in a pocket or other locations. The hand-held portion 100 may have a simple structure, and therefore, the hand-held portion may be manufactured to be light and thin. A relatively small number of electronic components may be arranged in the hand-held portion 100, such that runtime of the hand-held portion 100 may be improved. The body portion 200 may be arranged with a relatively large sized battery to improve runtime of the body portion 100. After assembling the hand-held portion 100 with the body portion 200, the user may still use the mobile terminal 10 easily. It may be understood that, the mobile terminal 10 may be a tablet computer, a hand-held computer, or the like.

Figure 4:
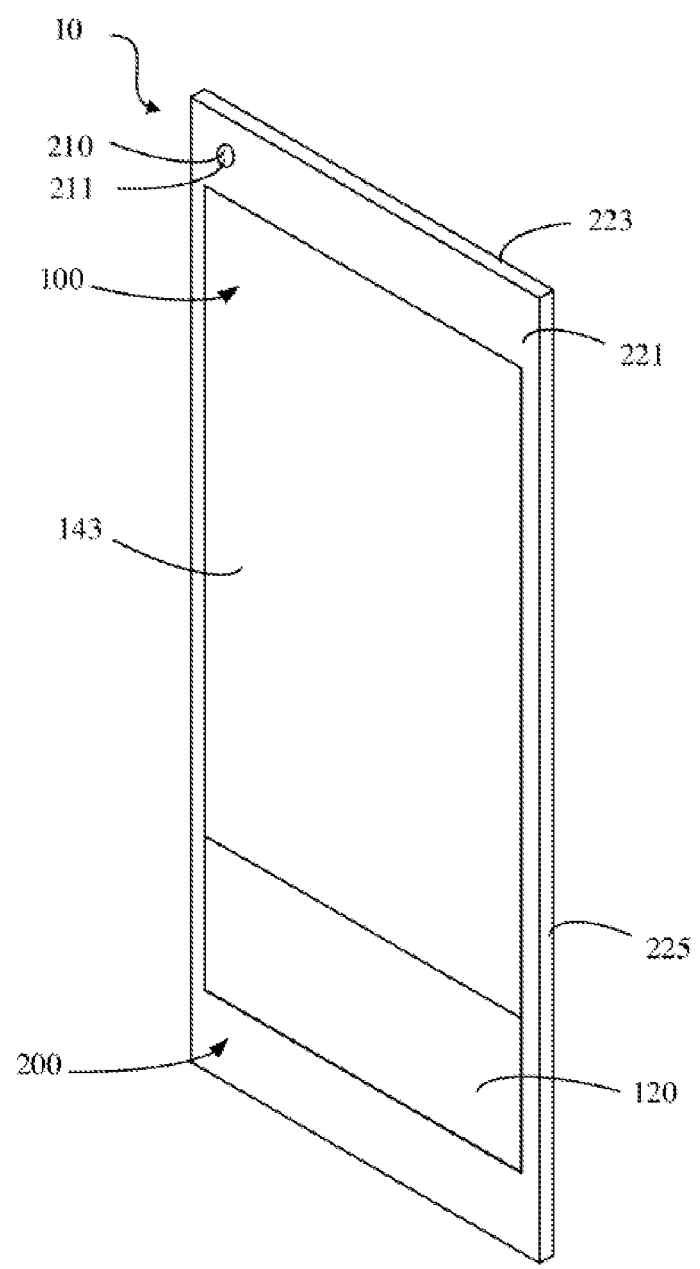
FIG. 4 is a perspective view of another state of the mobile terminal shown in FIG. 2.

As shown in FIG. 1 and FIG. 2, the hand-held portion 100 may be received into the receiving space 230 from the front surface 221 of the body portion 200, such that the display screen 130 and the light incidence surface 211 may face towards a same direction. In such a way, the camera module 210 may serve as a front camera, and the user may make a selfie or make a video call via the camera module 210. It may be understood that, the direction towards which the display screen 130 faces may refer to a direction towards which the display screen 130 displays information for the user, and the direction towards which the light incidence surface 211 faces may refer to a direction from which ambient light enters the light incidence surface 211. The display surface of the display screen 130 may be a surface able to be touched by the user directly. The display surface may display information and provide an interface for the user to perform a touch operation and the like. As shown in FIG. 4, the hand-held portion 100 may be received into the receiving space 230 from the rear surface 223 of the body portion 200, such that the display screen 130 and the light incidence surface 211 may face towards two opposite directions. In such a way, the camera module 210 may serve as a rear camera. The user may photograph from a distant view or record a video via the camera module 210. In such a way, the body portion 200 may not be required to be arranged with the camera module 210 on each of the front surface 221 and the rear surface 223. Therefore, the number of components arranged in the mobile terminal 10 may be reduced, and manufacturing cost of the mobile terminal 10 may be reduced. Further, the camera module 210 may have high resolution, and therefore, quality of a selfie image and an image captured by the rear camera may be improved. It may be understood that, the camera module may be arranged on each of the hand-held portion 100 and the body portion 200, and any technical solution having the above technical features should be within the scope of the present disclosure.

Figure 5:
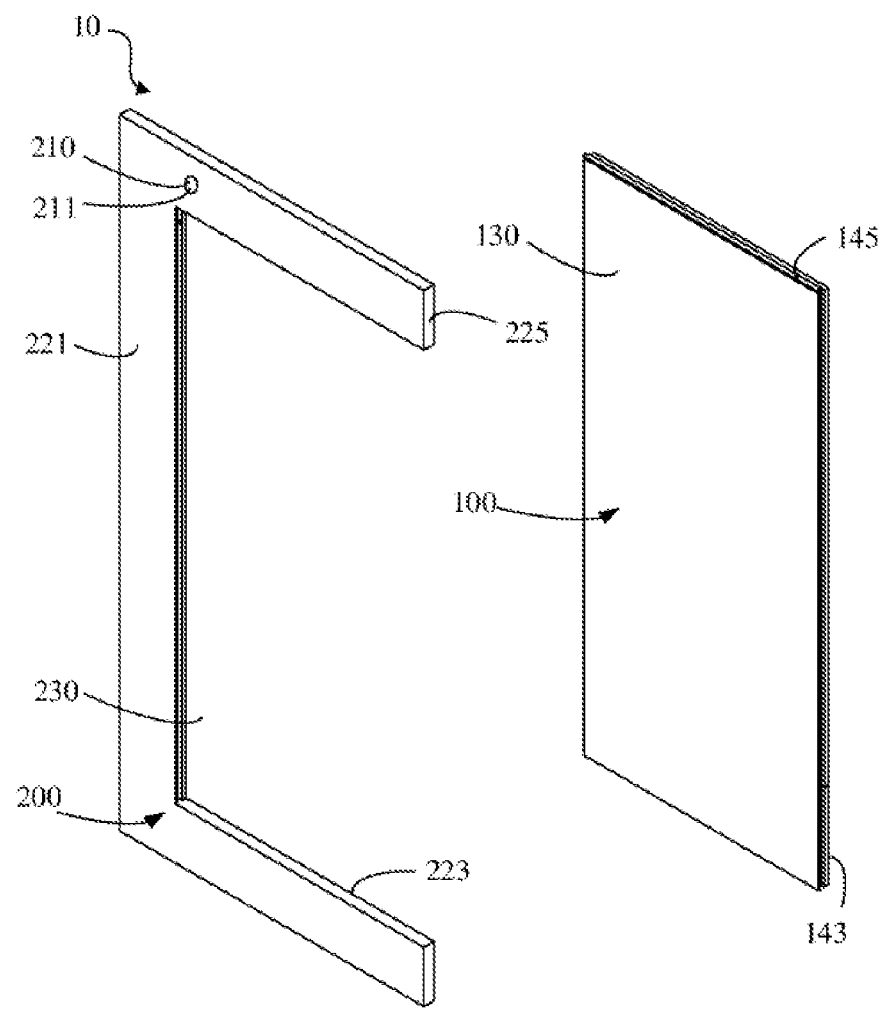
FIG. 5 is an exploded perspective view of a mobile terminal according to another embodiment of the present disclosure.

As shown in FIG. 5, the receiving space 230 may communicate with an outside of the mobile terminal from a periphery of the mobile terminal. The receiving space 230 may further extend along a width direction of the body portion 200 to interrupt the side surface 225. The hand-held portion 100 may be received into the receiving space from the interrupted side surface 225, enabling the display screen 130 and the light incidence surface 211 to face towards the same direction or two opposite directions. According to the present embodiment, the user may insert the hand-held portion 100 into the receiving space 230 of the body portion 100 from the interrupted side surface 225 of the body portion 200. A wall of the receiving space 230 may serve as a guide, such that the hand-held portion 100 may be easily inserted or taken out. When the display screen 130 and the light incidence surface 211 face towards the same direction, the camera module 210 may serve as the front camera. When the display screen 130 and the light incidence surface 211 face towards two opposite directions, the camera module 210 may serve as the rear camera.

In one embodiment, the hand-held portion 100 may substantially be rectangular. The hand-held portion 100 may include a front face 141, a rear face 143, and a side face 145 connecting the front end face 141 to the rear end face 143. The display screen 130 may be arranged on the front face 141. The hand-held portion 100 may be received into the receiving space 230 from the front face 141 or the rear face 143. Specifically, two opposite sides of an appearance of the hand-held portion 100 may be arranged to be symmetrical about a central axis along a length direction of the hand-held portion 100, and two opposite sides of the receiving space 230 may be defined to be symmetrical. That is, two opposite side edges of the hand-held portion 100 along the length direction of the hand-held portion 100 may have an identical structure, and two opposite side walls of the receiving space 230 along the length direction of the body portion 100 may have an identical structure. During assembling, the user may allow the front face 141 of the hand-held portion 100 to face the rear surface 223 of the body portion 200 and place the hand-held portion 100 into the body portion 200. Alternatively, the user may allow the rear face 143 of the hand-held portion 100 to face the rear surface 223 of the body portion 200 and place the hand-held portion 100 into the body portion 200. A structure of the present embodiment may allow the display screen 130 and the light incidence surface 211 to face to the same direction or two opposite directions. Further, the user may not be required to determine the front face 141 or the rear face 143 of the hand-held portion 100 deliberately, and either one of the front face 141 or the rear face 143 may be arranged to face the rear surface 223 of the body portion 200 and received into the receiving space 230, such that the hand-held portion 100 and the body portion 200 may be easily assembled, improving convenience of using the mobile terminal.

Figure 6:
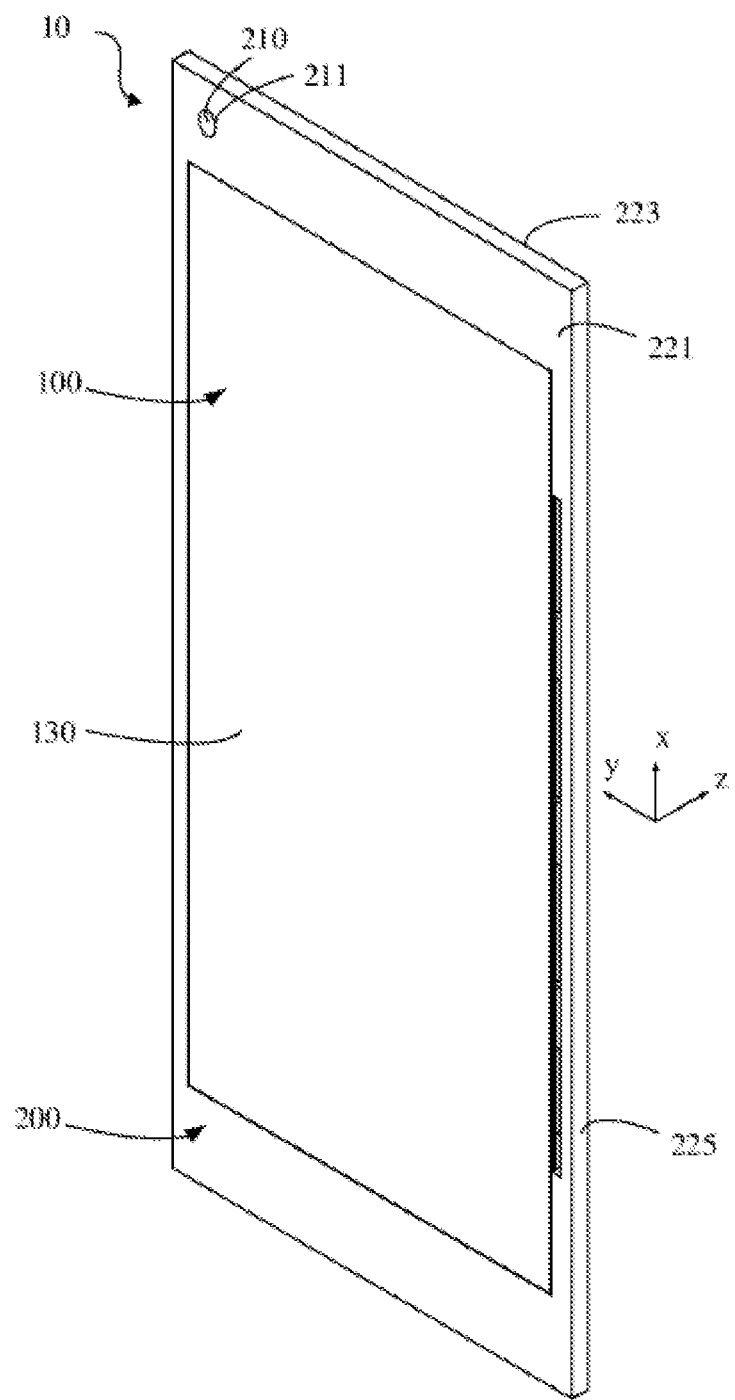
FIG. 6 is a perspective view of a mobile terminal according to still another embodiment of the present disclosure.
Figure 7:
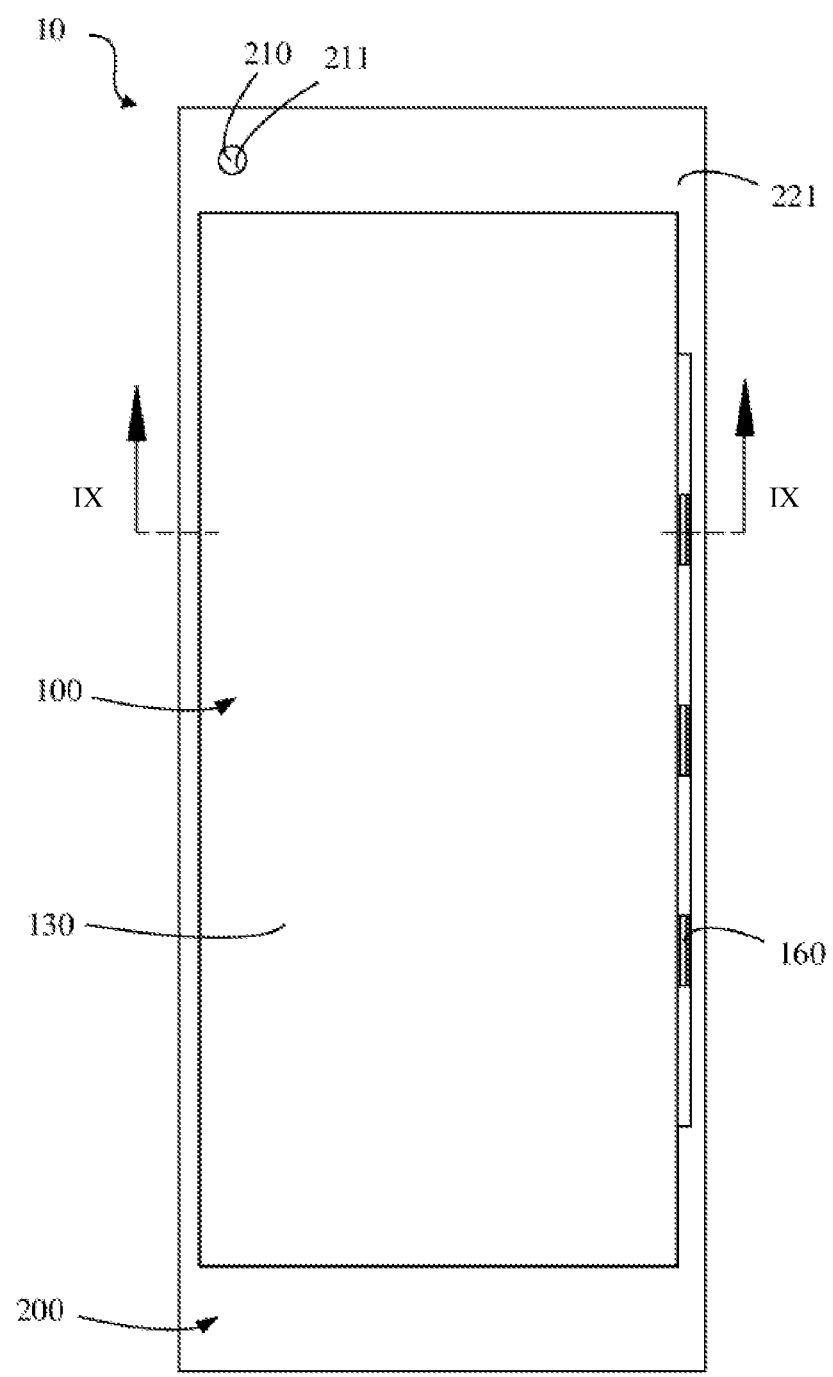
FIG. 7 is a front view of the mobile terminal shown in FIG. 6.
Figures 8, 9:
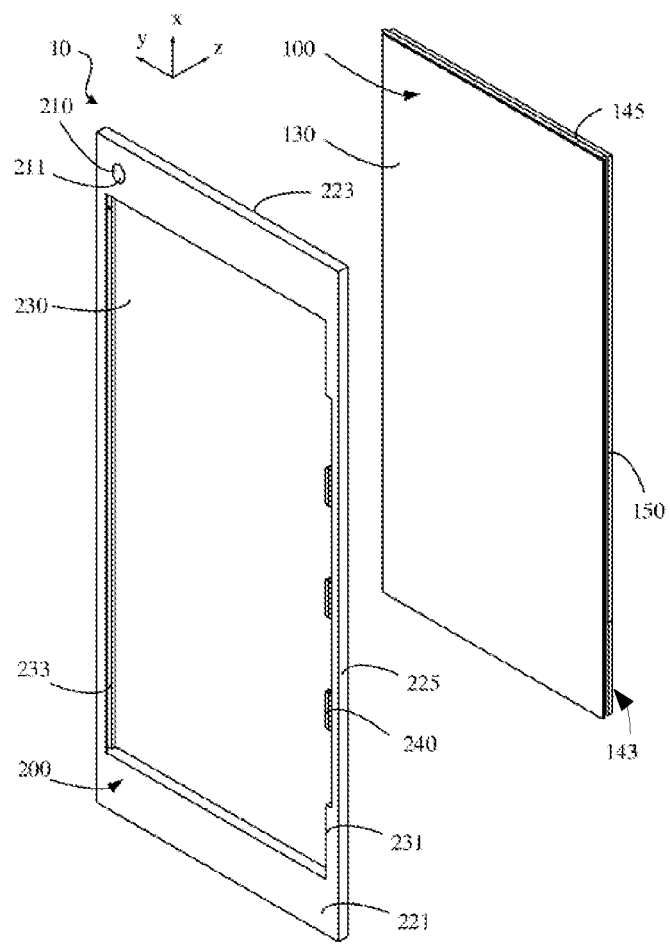
FIG. 8 is an exploded perspective view of the mobile terminal shown in FIG. 6.
FIG. 9 is a cross-sectional view of the mobile terminal shown in FIG. 7 taken along a line IX-IX.
Figure 10:
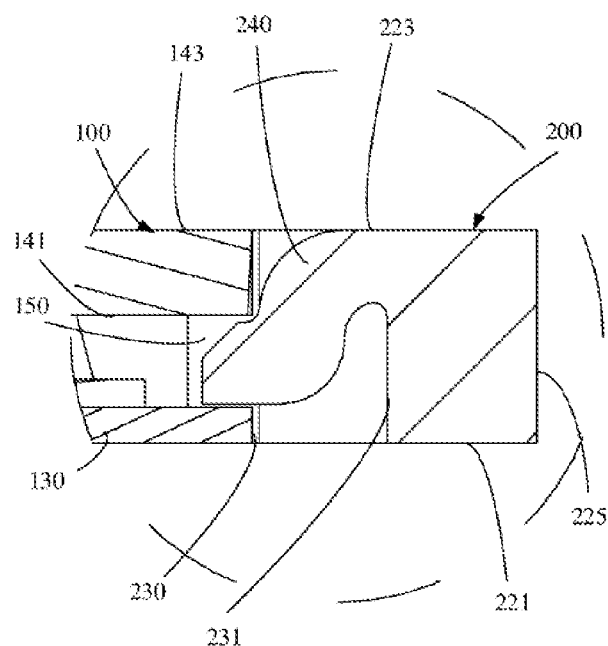
FIG. 10 is an enlarged view of a portion B of the mobile terminal shown in FIG. 9.

As shown in FIGS. 6 to 8, in one embodiment, a cross section of the receiving space 230 may substantially be rectangular. The receiving space 230 may have a first wall 231 and a second wall 233 opposite to the first wall 231. Further, as shown in FIG. 9 and FIG. 10, the first wall 231 may be arranged with a spring button 240 protruding into the receiving space 230, and a side edge of the hand-held portion 100 may define a button slot 150. The spring button 240 may be engaged into the button slot 150, such that the hand-held portion 100 may be engaged with the body portion 200. In one embodiment, the spring button 240 may suspend into the receiving space 230, and an end of the spring button 240 may be connected to the first wall 231. During receiving the hand-held portion 100 into the receiving space 230, the spring button 240 may be elastically deformed by a pressure applied by the hand-held portion 100, and another end of the spring button 240 may be received in the button slot 150, such that the hand-held portion 100 may be received into the receiving space 230 and engaged with the body portion 200, and may not depart from the body portion 200 easily. The spring button 240 may be made of plastics, silicon, or metal.

As shown in FIGS. 7 and 8, in one embodiment, a plurality of spring buttons 240 may be arranged on the first wall 231 and spaced apart from each other. The spring button 240, the first wall 231, and the hand-held portion 100 may define a recessed grip 160. Specifically, two adjacent spring buttons 240 may be spaced apart from each other with a certain distance. After the hand-held portion 100 is engaged into the body portion 200, the first 231 and the side edge of the hand-held portion 100 may define a certain distance. The spring button 240, the first wall 231, and the side edge of the hand-held portion 100 may define the recessed grip 160 for a finger of the user to apply a force to take the hand-held portion 100 out of the receiving space 230. It may be understood that, when the plurality of spring buttons 240 are arranged, the recessed grip 160 may be defined by any two adjacent spring buttons 240 or defined between the spring button 240 and an end of the first wall 231. Alternatively, an obvious label may be provided at a location in which the recessed grip 160 is defined. For example, along the length direction of the body portion 200, a relatively long recessed grip 160 may be defined, and a recess may be defined in the first wall 231 or the side edge of the hand-held portion 100, such that the fingertip of the user may easily reach the recessed grip 160 and apply the force to the hand-held portion 100, and the hand-held portion 100 may be easily taken out of the body portion 200. In another embodiment, two opposite side edges of the hand-held portion 100 along the length direction of the hand-held portion 100 may have an identical structure, and two opposite side walls of the receiving space 230 along the length direction of the body portion 100 may have an identical structure. Each of the first wall and the second wall may be arranged with the spring button 240, and each of the two opposite side edges of the hand-held portion 100 may define the button slot 150 corresponding to the spring button 240. In such a way, the hand-held portion 100 may be engaged with the body portion 200 without determining the front surface 221 or the rear surface 223 of the body portion 100.

Figure 11:
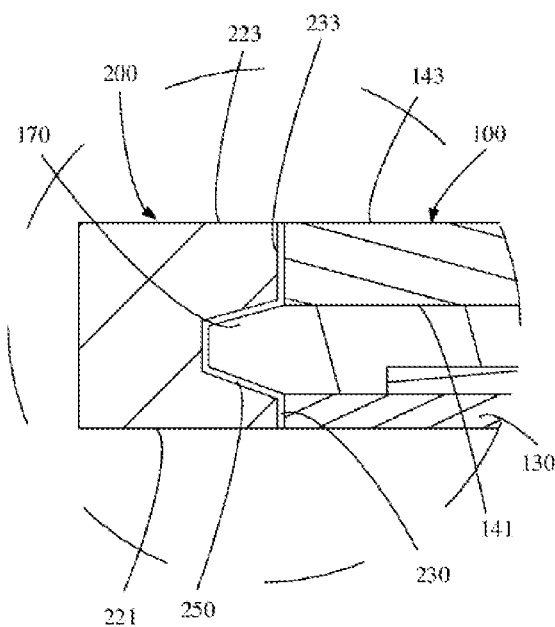
FIG. 11 is an enlarged view of a portion C of the mobile terminal shown in FIG. 9.

As shown in FIG. 11, in one embodiment, the second wall 233 may define a guiding groove 250, and the guiding groove 250 may extend along the length direction of the body portion 200 (an x-axis direction). Another side edge of the hand-held portion 100 may be arranged with a guiding rail 170, and the guiding rail 170 may be received in the guiding groove 250. Specifically, in the embodiment shown in FIG. 7, a plane perpendicular to the length direction of the body portion 200 may be defined, and a cross section of the guiding groove 250 taken along the plane may substantially be trapezoid, and a cross section of the guiding rail 170 taken along the plane may substantially be trapezoid. Edges of the hand-held portion 100 may be arranged with a protection structure, such as a support made of plastics or metal. The guiding rail 170 and the support of the edges of the hand-held portion 100 may be made into an integral structure. Alternatively, the guiding rail 170 and the support may be welded or adhered to form the integral structure. The guiding rail 170 may extend from an end of the hand-held portion 100 to another end of the hand-held portion 100 along the length direction of the hand-held portion 100. The guiding rail 170 may protrude out of a side face of the hand-held portion 100 and may be easily received into the guiding groove 250, such that two side edges of the hand-held portion 100 along a width direction of the hand-held portion 100 may both be engaged, and the hand-held portion 100 may not easily fall off from the body portion 200. It may be understood that, the guiding rail 170 and the guiding groove 250 may be omitted.

As shown in FIG. 11, in one embodiment, after receiving the hand-held portion 100 into the receiving space 230 by allowing the display screen 130 of the hand-held portion 100 to face the front surface 221, a side on which the display screen 130 is arranged may align with the front surface 221, and a side of the hand-held portion 100 opposite to the display screen 130 may align with the rear surface 223. In such a way, an integral and aesthetic appearance of the mobile terminal 10 may be provided. In other embodiments, the guiding groove 250 may be defined at a middle of the second wall 233 along a thickness direction of the body portion 200, the spring button 240 may be arranged at a middle of the first wall 231 along a thickness direction of the body portion 200, and the guiding rail 170 and the button slot 150 may be arranged and defined at a middle of the hand-held portion 100 along the thickness direction of the hand-held portion 100. When the hand-held portion 100 is received into the receiving space 230 allowing the display screen 130 to face the front surface 221, the side on which the display screen 130 is arranged may align with the front surface 221, and the side of the hand-held portion 100 opposite to the display screen 130 may align with the rear surface 223. When the hand-held portion 100 is received into the receiving space 230 allowing the display screen 130 to face the rear surface 223, the side on which the display screen 130 is arranged may align with the rear surface 223, and the side of the hand-held portion 100 opposite to the display screen 130 may align with the front surface 221. In such a way, an integral and aesthetic appearance of the mobile terminal 10 may be provided.

It may be understood that, in the embodiment of the hand-held portion 100 using a rechargeable battery, the hand-held portion 100 and the body portion 200 may be arranged with a recharging interface and a discharging interface correspondingly. For example, the wall of the receiving space 230 may be arranged with the discharging interface, and the hand-held portion 100 may be arranged with the recharging interface at a position corresponding to the discharging interface. When the hand-held portion 100 is received in the receiving space 230, the discharging interface and the recharging interface may be coupled, and the body portion 200 may recharge the hand-held portion 100. It may be understood that, the recharging and the discharging interfaces may be type-C interfaces or micro USB interfaces. Alternatively, an elastic pin and a metal contact able to be coupled with each other may be arranged, such that the body portion 200 may recharge the hand-held portion 100 in time, and the user may use the hand-held portion 100 easily. The body portion 200 may be arranged with a non-transitory storage module having relatively large storage capacity. The non-transitory storage module may be arranged to store data. The capacity of the non-transitory storage module may be relatively large, such that the body portion 200 may have a relatively large space for storing data. The body portion 200 may further include electronic components, such as a processor. The processor may be configured to control the second wireless communication module 260, the third wireless communication module 270, and the non-transitory storage module to operate, which will not be described in details hereinafter.

In one embodiment, the display screen 130 may be a liquid crystal display (LCD) screen to display information. The LCD screen may be a thin film transistor (TFT) screen, an in-plane switching (IPS) screen, or a splice liquid crystal display (SLCD) screen. In another embodiment, the display screen 130 may be an organic light emitting diode (OLED) screen to display information. The OLED screen may be an active matrix organic light emitting diode (AMOLED) screen, a super OLED screen, or a super SMOLED plus screen, which will not be described in details hereinafter.

Technical features of the above-mentioned embodiments may be combined arbitrarily. In order to provide a concise description, not all potential combinations of various technical features of the embodiments are described. However the combinations of the various technical features should be within the scope of the present disclosure, with the proviso of the combinations of the various technical features having no conflicts.

The above description provides various implementations of the present disclosure, and the implementations are described specifically and in details, but this should not be deemed as limitation to the scope of the present disclosure. To be noted that, to any one of skill in the art, without departing from the concept of the present disclosure, various deformations and improvements may be performed and should be within the scope of the present disclosure. Therefore, the scope of the present disclosure will be defined by the claims of the present disclosure.

What is claimed is:

1. A mobile terminal, comprising:
    a hand-held portion, comprising a first wireless communication module, a first power module, and a display screen, wherein the first power module is electrically connected to both the first wireless communication module and the display screen; and
    a body portion, comprising a camera module, a second wireless communication module, a third wireless communication module, and a second power module,
    wherein the second power module is electrically connected to the camera module, the second wireless communication module, and the third wireless communication module;
    the third wireless communication module is configured to communicatively connect to an external device;
    the body portion has a front surface, a rear surface opposite to the front surface, and a side surface connecting to the front surface the rear surface;
    the body portion defines a receiving space extending through the front surface and the rear surface;
    a portion of the front surface is used as a light incidence surface for the camera module and allows light to pass through and enter the camera module;
    the hand-held portion is capable of being received into or taken out of the receiving space; and
    when the hand-held portion is taken out of the receiving space, the second wireless communication module is communicatively connected to the first wireless communication module.

2. The mobile terminal according to claim 1, wherein the receiving space has a first wall and a second wall opposite to the first wall, the first wall and the second wall are symmetrical around a central axis along a length direction of the body portion, the body portion defines a central plane parallel to the front surface and the rear surface, a distance between the front surface and the central plane is equal to a distance between the rear surface and the central plane, the first wall is symmetrical about the central plane, the second wall is symmetrical about the central plane, such that the hand-held portion is capable of being received into the receiving space from the front surface or the rear surface, enabling the display screen and the light incidence surface face towards a same direction.

3. The mobile terminal according to claim 1, wherein the receiving space has a first wall and a second wall opposite to the first wall, the first wall and the second wall are symmetrical around a central axis along a length direction of the body portion, the body portion defines a central plane parallel to the front surface and the rear surface, a distance between the front surface and the central plane is equal to a distance between the rear surface and the central plane, the first wall is symmetrical about the central plane, the second wall is symmetrical about the central plane, such that the hand-held portion is capable of being received into the receiving space from the front surface or the rear surface, enabling the display screen and the light incidence surface face towards two opposite directions.

4. The mobile terminal according to claim 1, wherein the receiving space is further defined to extend through the body portion along a width direction of the body portion, such that the side surface is interrupted, and the hand-held portion is capable of being received into the receiving space from the interrupted side surface, such that the display screen and the light incidence surface face towards a same direction or two opposite directions.

5. The mobile terminal according to claim 1, wherein
the hand-held portion comprises a front face, a rear face, and a side face connecting to the front face and the rear face, the display screen is disposed on the front face; and
the hand-held portion is capable of being received in to the receiving space from a side on which the front face is arranged or a side on which the rear face is arranged.

6. The mobile terminal according to claim 1, wherein the receiving space has a first wall and a second wall opposite to the first wall, the first wall is arranged with a spring button protruding out of the first wall towards an inside of the receiving space, a side edge of the hand-held portion defines a button slot, and the spring button is configured to be inserted into the button slot, such that the hand-held portion is engaged with the body portion.

7. The mobile terminal according to claim 6, wherein a plurality of spring buttons are arranged on the first wall and spaced apart from each other; and each of the spring buttons, the first wall, and the hand-held portion defines a recessed grip.

8. The mobile terminal according to claim 6, wherein the second wall defines a guiding groove extending along a length direction of the body portion, another side edge of the hand-held portion is arranged with a guiding rail, and the guiding rail is configured to be received into the guiding groove.

9. The mobile terminal according to claim 1, wherein each of the first wireless communication module and the second wireless communication module is a Bluetooth communication module, a WiFi communication module, a ZigBee communication module, or a near field communication module.

10. The mobile terminal according to claim 1, wherein when the hand-held portion is received in the receiving space, one of the front surface and the rear surface is arranged to align with a side on which the display screen of the hand-held portion is arranged, and the other of the front surface and the rear surface is arranged to align with a side opposite to the side on which the display screen of the hand-held portion is arranged.

11. The mobile terminal according to claim 1, wherein
the hand-held portion is arranged with a recharging interface, the body portion is arranged with a discharging interface; and
the body portion is configured to recharge the hand-held portion when the hand-held portion is engaged with the body portion.

12. A mobile phone, comprising:
a hand-held portion, comprising a first wireless communication module, a first power module, and a display screen, wherein the first power module is electrically connected to both the first wireless communication module and the display screen; and
a body portion, comprising a second wireless communication module, a third wireless communication module, and a second power module,
wherein the second power module is electrically connected to the second wireless communication module and the third wireless communication module;
the third wireless communication module is configured to communicatively connect to an external device;
the body portion has a front surface, a rear surface opposite to the front surface, and a side surface connecting to the front surface the rear surface;
the body portion defines a receiving space extending through the front surface and the rear surface;
the hand-held portion is capable of being received into or taken out of the receiving space; and
when the hand-held portion is taken out of the receiving space, the second wireless communication module is communicatively connected to the first wireless communication module.

13. The mobile phone according to claim 12, wherein the body portion comprises a camera module electrically connected to the second power module, and the camera module is capable of receiving ambient light from the front surface.

14. The mobile phone according to claim 13, wherein
a direction towards which the display screen displays information and a direction from which the ambient light enters the camera module are the same.

15. The mobile phone according to claim 13, wherein a direction towards which the display screen displays information and a direction from which the ambient light enters the camera module are two opposite directions.

16. The mobile phone according to claim 13, wherein the receiving space further extends through the body portion along a width direction of the body portion, such that the side surface is interrupted, and the hand-held portion is capable of being received into the receiving space from the interrupted side surface, such that a direction towards which the display screen displays information and a direction from which the ambient light enters the camera module are the same or opposite to each other.

17. The mobile phone according to claim 12, wherein
the receiving space has a first wall and a second wall opposite to the first wall, the first wall is arranged with a spring button protruding out of the first wall towards an inside of the receiving space, a side edge of the hand-held portion defines a button slot, and the spring button is configured to be received into the button slot, such that the hand-held portion is engaged with the body portion.

18. The mobile phone according to claim 17, wherein
a plurality of spring buttons are arranged on the first wall and spaced apart from each other; and each of the spring buttons, the first wall, and the hand-held portion defines a recessed grip.

19. The mobile phone according to claim 17, wherein
the second wall defines a guiding groove extending along a length direction of the body portion, another side edge of the hand-held portion is arranged with a guiding rail, and the guiding rail is configured to be received into the guiding groove.

20. An electronic device, comprising:
a hand-held portion, comprising a first wireless communication module, a first power module, and a display screen, wherein the display screen has a display surface to display information for a user, and the first power module is electrically connected to both the first wireless communication module and the display screen; and
a body portion, comprising a second wireless communication module, a third wireless communication module, and a second power module,
wherein the second power module is electrically connected to the second wireless communication module and the third wireless communication module;
the third wireless communication module is configured to communicatively connect to an external device;

the body portion has a front surface, a rear surface opposite to the front surface, and a side surface connecting to the front surface the rear surface;

the body portion defines a receiving space extending through the front surface and the rear surface;

the receiving space has a first wall and a second wall opposite to the first wall;

at least one spring button is arranged on the first wall and protrude out of the first wall towards an inside of the receiving space, a side edge of the hand-held portion defines at least one button slot, the at least one spring button is configured to be received in the at least one button slot, such that the hand-held portion is engaged with the body portion; and when the hand-held portion is taken out of the receiving space, the second wireless communication module is communicatively connected to the first wireless communication module.

\* \* \* \* \*